March 17, 1953 S. HILLER, JR., ET AL 2,631,679
ROTOR HEAD FOR ROTARY WING AIRCRAFT
Filed June 25, 1951 4 Sheets-Sheet 1

INVENTORS
STANLEY HILLER, JR.
HAROLD H. SIGLER
BY
Charles M. Fryer
ATTORNEY

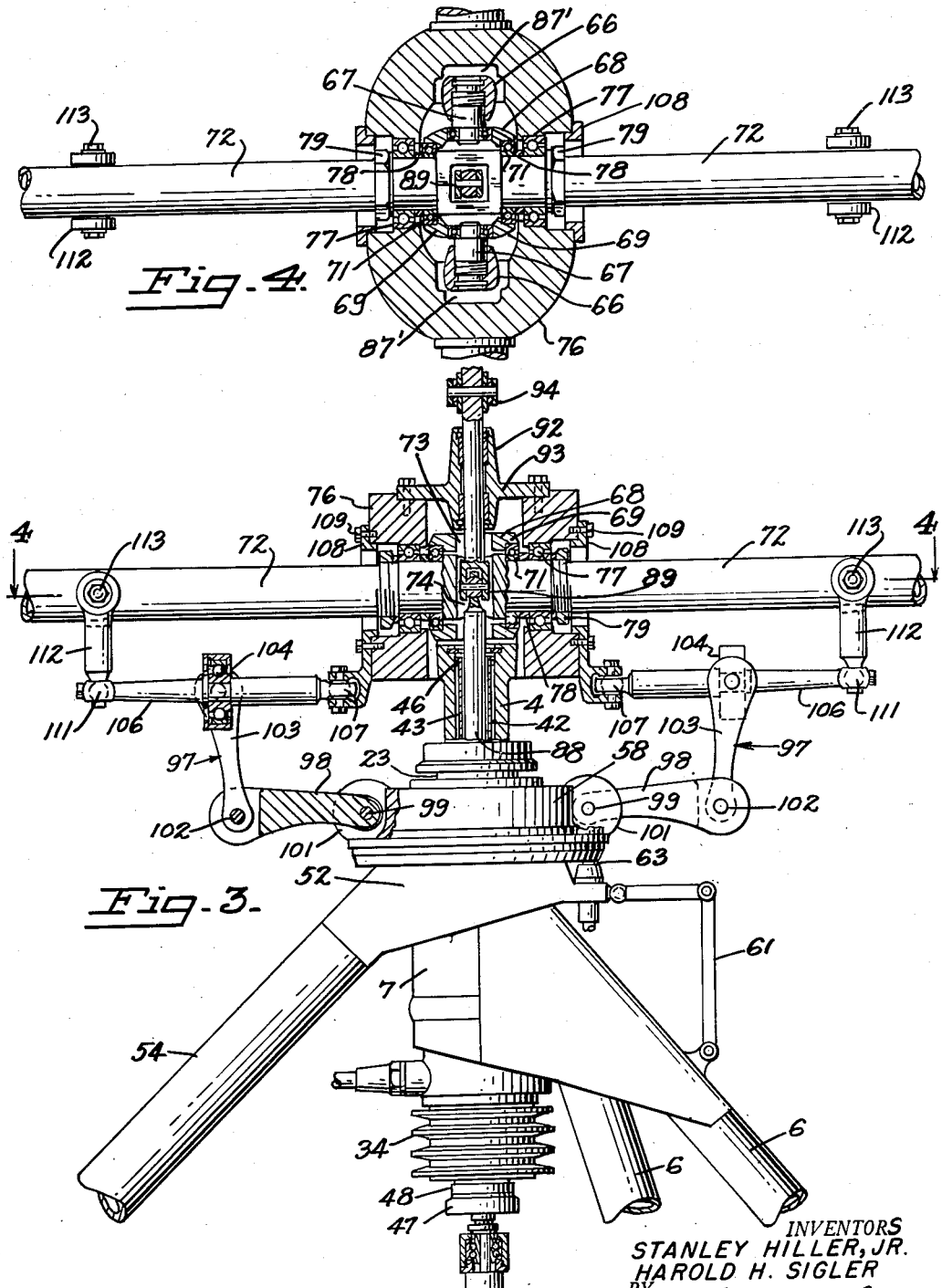

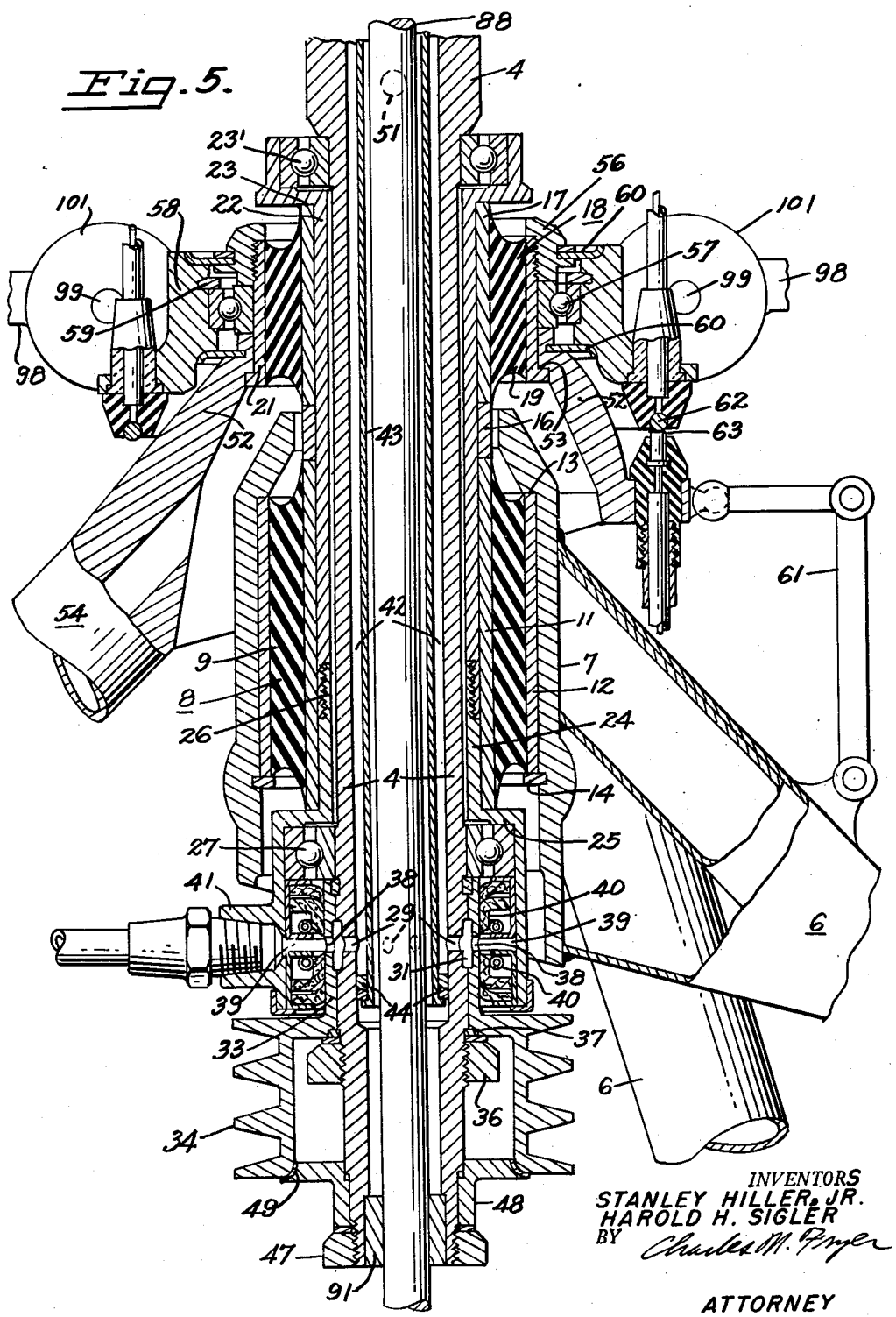

March 17, 1953     S. HILLER, JR., ET AL     2,631,679
ROTOR HEAD FOR ROTARY WING AIRCRAFT
Filed June 25, 1951     4 Sheets-Sheet 4
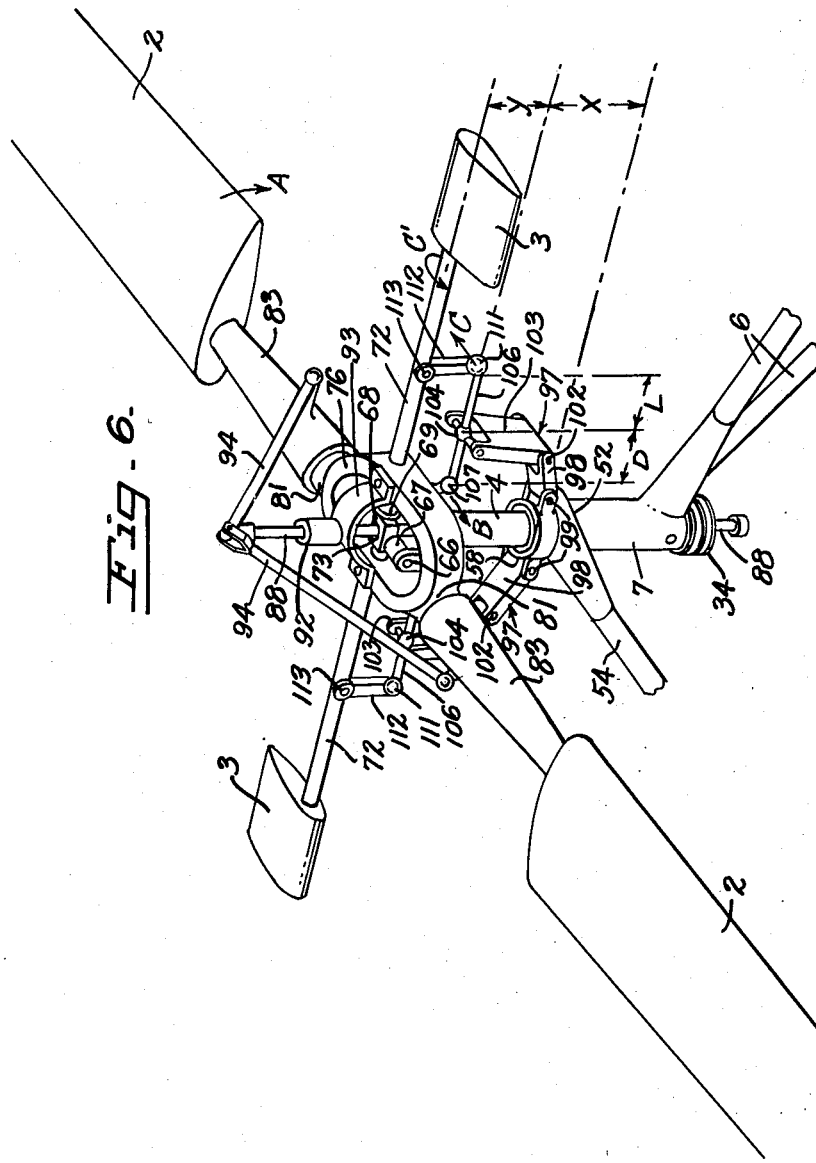
INVENTORS
STANLEY HILLER, JR.
HAROLD H. SIGLER
BY Charles M. Fryer
ATTORNEY Patented Mar. 17, 1953

2,631,679

UNITED STATES PATENT OFFICE 2,631,679

ROTOR HEAD FOR ROTARY WING AIRCRAFT

Stanley Hiller, Jr., Atherton, and Harold H. Sigler, San Carlos, Calif., assignors to Hiller Helicopters, Palo Alto, Calif., a corporation of California Application June 25, 1951, Serial No. 233,417

14 Claims. (Cl. 170—160.26)

This invention relates to rotary wing aircraft, such as helicopters and autogiros, and more particularly to a helicopter rotor control system of the type disclosed in assignee's Patent No. 2,481,750, dated September 13, 1949, wherein a pilot controlled control blade is provided to control the cyclic pitch and ultimate flapping of a lift wing, and in which is also provided a "feedback" leverage to impart pitch adjustment of the control blade resulting from flapping or end to end tilting of the lift wing to accomplish the results explained in assignee's Patent No. 2,534,353, dated September 19, 1950.

In a rotor system of the type described and as is explained in such patents, the control blades for the lift wings of the rotor are each relatively small and do not have any material lift characteristics insofar as support of the aircraft is concerned, and they do not necessarily contribute to the lift of the aircraft. The usual pilot operable cyclic pitch control mechanism in the form of a so-called wobble mechanism is employed to impart cyclic pitch or pitch change to the control blades which are connected by means including a universal mount structure to the lift wings, so that when the pilot controls the wobble mechanism, to control the cyclic pitch of the control blades, cyclic pitch is imparted to the lift wings and this ultimately results in flapping of the lift wings.

As disclosed in Patent No. 2,534,353, it is desirable under certain conditions that the initial cyclic pitch adjustment amplitude of the control blades, particularly when the ship is leaving the ground, be at a relatively high angle but it is undesirable for the lift wings to flap to the extent determined by such angle. Hence, a feed back leverage is provided which immediately operates when the lift wing commences to flap to cancel out some of the excess angular adjustment employed to effect adjustment of the pitch of the control blades, so that the lift wings will not flap to an excessive angle. The feed back leverage is of advantage in compelling the lift wing rotor to follow inclination of the rotor column, as is also explained in Patent No. 2,534,353.

Summarizing this invention, it resides in an improved rotor head construction embodying an improved universal mount structure for enabling pitch adjustment and flapping of both the lift wing and the control blade, which is of economical and simple construction and which is particularly adapted for employment with a jet propelled rotor but which may also be utilized with a rotor positively rotated by a prime mover on the body of the ship. In the improved rotor head construction, the pitch adjustment axis of the control rotor blade is coincident with the flapping axis of the lift wing, and a special feed back linkage is provided to produce the feed back effect for such type of mounting.

The linkage includes a feed-back lever which is movably connected between shafting which supports a control blade, and a common hub member to which both a lift wing and the control blade are connected. This feed back lever is anchored on linkage connected to pilot operable wobble mechanism, so that when the lift wing flaps, the control blade pitch will be automatically adjusted through the lever member. Although the described feed back arrangement is particularly advantageous with a rotor head construction in which the control blade pitch adjustment axis is coincident with the flapping axis of the lift wing, it can also be employed to produce predetermined feed back effects in constructions where these axes are vertically displaced especially where the control blade pitch adjustment axis is above the lift wing flapping axis.

Referring to the drawings:

Fig. 3 is a similar view taken in planes indicated by line 3—3 in Fig. 1;

Fig. 4 is a fragmentary horizontal section, partly in elevation, taken in a plane indicated by line 4—4 in Fig. 3; portions of the structure being omitted from the view to illustrate more clearly the construction;

Fig. 5 is an enlarged fragmentary vertical sectional view, partly in elevation, of a form of mounting and pilot operable control mechanism for the rotor head, particularly adapted for a jet propulsion rotor; portions of the structure being omitted from the view to illustrate more clearly the construction;

Fig. 6 is a schematic isometric view of the main elements embodied in the rotor head construction of this invention.

The helicopter is of the type disclosed in the aforementioned patents, comprising a pair of diametrically opposite lift wings 2 and also a pair of control blades or paddles 3 which are universally mounted on the top of a rotor column and which function in the manner disclosed in the aforementioned patents. In this connection, the particular rotor column and associated structure, as illustrated in Fig. 5, are particularly designed for the type of jet propelled helicopter disclosed in assignee's co-pending application, by Stanley Hiller, Jr. and Harold H. Sigler, Serial No. 233,418, filed June 25, 1951, for "Rotary Wing Aircraft System," and is disclosed herein for purposes of illustration. It is to be understood that the rotor head and feed back construction of this invention may be employed in any type of helicopter irrespective of whether the rotor is jet propelled, or power driven by the usual prime mover mounted on the body of the ship.

Figure 1:
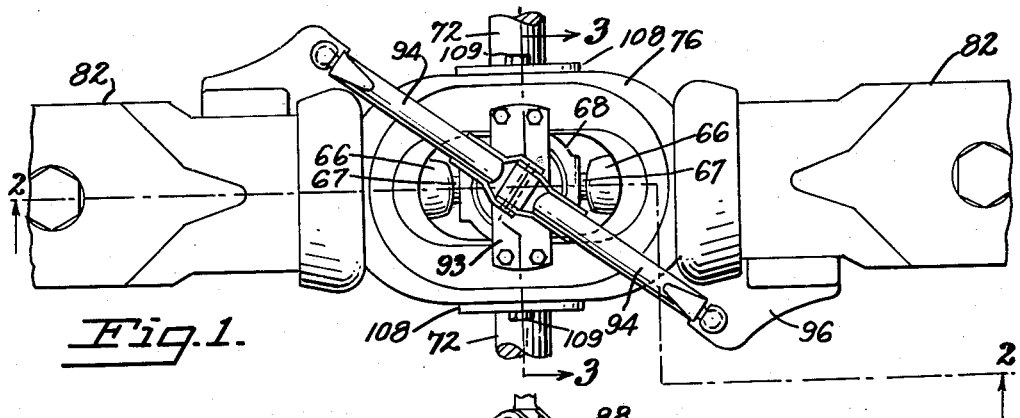
Fig. 1 is a fragmentary plan view of the rotor head construction.
Figure 2:
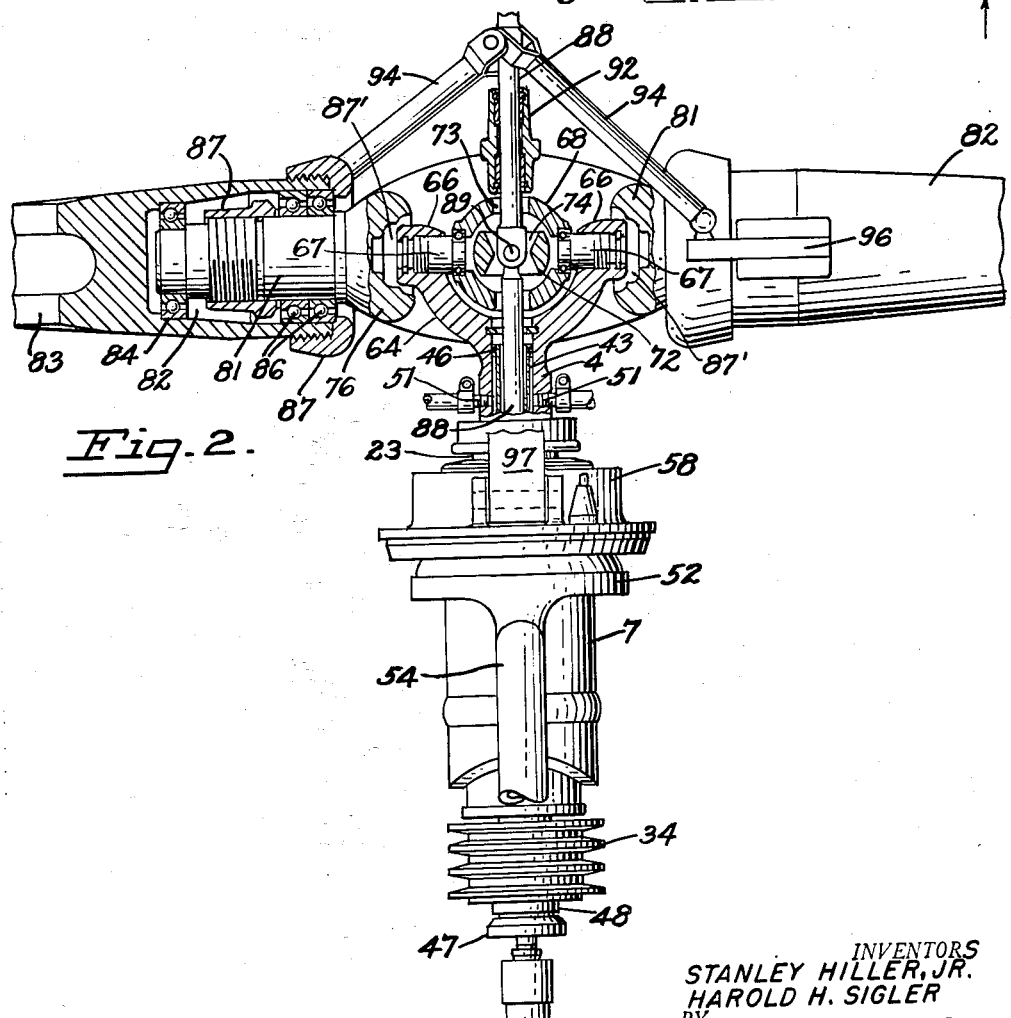
Fig. 2 is a vertical sectional view, partly in elevation, taken in planes indicated by line 2—2 in Fig. 1; portions of the structure being omitted from the view to illustrate the construction more clearly.

As illustrated in Figs. 2, 3 and particularly Fig. 5, the rotor supporting column comprises a hollow shaft 4 which is rotatable about its axis. The mounting for shaft 4 comprises struts 6 secured to the body (not shown) of the ship, and to the upper ends of which is welded, or secured by any other suitable means, a bracket sleeve 7 through which rotor shaft 4 extends. A floating or resilient isolation mount is provided for the rotor shaft and associated structure in sleeve 7, comprising a so-called "Lord" tube form bonded rubber shear type mounting 8 formed of a sleeve 9 of flexible resilient material, such as rubber, bonded to an inner metal sleeve 11 and to an outer metal sleeve 12. Outer sleeve 12, and consequently the entire mounting 9, is fixedly clamped against a shoulder 13 of bracket sleeve 7 by means of split clamping ring 14. Clearance is provided at the upper and the lower ends of sleeve 7; and such ends thus serve as limit stops for the resilient isolation mount.

Abutting the top of sleeve 11 is a spacer ring 16 which abuts an inner metal sleeve 17 of a flexible resilient mounting 18 of the wobble or cyclic pitch control mechanism. Mounting 18 is disclosed and claimed in assignee's co-pending application by Stanley Hiller, Jr., Serial No. 202,770, filed December 26, 1950, for "Cyclic Pitch Control Mounting for Rotary Wing Aircraft," and is of the same type as mounting 8, and includes a rubber sleeve 19 bonded both to inner metal sleeve 17 and to an outer metal sleeve 21. A stationary sleeve 22 is positioned about rotor shaft 4 and is provided with an upper shoulder 23 against which the resilient wobble mechanism mounting 18 is clamped; a bearing 23' being provided on shoulder 23 for rotor shaft 4.

Stationary sleeve 22 extends into bracket sleeve 7; and all the previously described assembly is held in position on bracket sleeve 7, by means of nut member 24 having a shoulder 25 abutting the lower end of sleeve 11 and a screw threaded sleeve portion 26 detachably screwed into the lower end of stationary sleeve 22. Since nut member 24 is detachably secured to sleeve 22 the described parts may be readily assembled.

At its lower end, rotor shaft 4 is piloted in a bearing 27 adjacent shoulder 25 of nut member 24. Fuel inlet ports 29 are provided about the periphery and adjacent the lower end of shaft 4, which communicate with an annular passage 31 formed by cooperating grooves in the outside of shaft 4 and in the inside of a sleeve 33 which is integral with a fuel pump (not shown) driving pulley 34; the sleeve being secured for rotation with shaft 4, and being thrust against the inner race of bearing 27 by means of a nut 36 bearing against sealing gasket 37. Sleeve 33 is provided with peripheral fuel inlet ports 38 communicating with the respective fuel inlet ports 29 of shaft 4.

Ports 38 communicate with an annular fuel supply passage 39 provided in nut member 24 between conventional liquid sealing ring structures 40 fixedly mounted in nut member 24 to prevent seepage of the fuel as it passes from a fuel inlet connection 41 on nut member 24 to fuel supply passage 39. The fuel passes upwardly inside of rotor shaft 4 through an annular passage 42 formed by means of a metal tube 43 which is provided at its lower end with an O-ring seal structure 44 which also serves to hold tube 43 for fixed rotation with the rotor shaft.

As illustrated in Figs. 2 and 3, the upper end of tube 43 is similarly fixed and sealed by O-ring seal structure 46. Pulley and sleeve assembly 33—34 is also secured in position for rotation with rotor shaft 4 by means of a clamping nut 47 screwed to the lower end of rotor shaft 4 and engaging a collar 48 which bears against the lower end of pulley 34; a centering ring 49 being provided between collar 48 and the pulley. Fuel flowing upwardly in passage 42 passes to the jet motors on the lift wings 2 through outlet connections 51 adjacent the top of the rotor shaft 4, as is disclosed in greater detail in assignee's aforementioned Hiller and Sigler copending application, Serial No. 233,418, filed June 25, 1951. The above described construction is the same as that disclosed in the latter co-pending application; and as previously mentioned, it is disclosed herein merely for purposes of illustration as any other type of rotor column and associated structure may be utilized.

The pilot operable means connected to mounting 18 of the wobble mechanism for effecting cyclic pitch control of the control paddles 3 is preferably of the type disclosed in the previously mentioned co-pending application, by Stanley Hiller, Jr., Serial No. 202,770. As is disclosed in such application, a ring member 52 is seated on a shoulder 53 formed at the lower end of outer sleeve 21 of mount 18, to which is attached an overhead pilot operable control stick 54. Ring member 52 is clamped in position by a nut 56 which also clamps the inner race of a roller bearing 57 against ring 52. The outer race of bearing 57 is seated on rotatable pitch control or wobble ring 58, and held in position by a snap ring 59; suitable seals 60 being provided over bearing 57. Anchoring linkage 61 is connected to ring 52 to confine the movements of the wobble mechanism to tilting only, as is disclosed in said co-pending application, Serial No. 202,770.

From the preceding, it is seen that the outer wobble ring 58 can have its plane of inclination adjusted merely by the operator controlling stick 54. Although an overhead control stick is illustrated, it is apparent that the wobble mechanism can be connected through any suitable linkage to a control stick mounted on the floor of the pilot's station (not shown) of the ship. Also, although the preferred type of wobble mechanism is disclosed, it is apparent that any other suitable or conventional type of cyclic pitch control or wobble mechanism may be employed.

In the particular embodiment of the ship illustrated, since such ship is of a jet propelled type, suitable ignition means, comprising electrical conducting means 62 mounted for rotation on rotatable wobble ring 58, cooperating with conductor means 63 mounted on fixed ring 52 are provided as is described in greater detail in the aforementioned co-pending Hiller and Sigler application, Serial No. 233,418, filed June 25, 1951.

Lift wings 2 and control blades 3 are universally mounted on the upper end of rotor column 4 to provide the type of control described in the aforementioned patents. For this purpose, the top end of the rotor column terminates in a fork 64, the diametrically opposite prongs 66 of which have fixedly mounted therein trunnion pins 67 on which is journalled a cross shaped universal mount member or spider element 68 which is consequently pivotally mounted on an axis defined by trunnions 67. On a transverse axis at a right angle to the axis at 67, spider 68 is provided with diametrically opposite bosses 69 in which is journalled for rotation in bearings 71, shafting 72 in the form of a single integral shaft at the outer ends of which are fixedly supported control blades 3. Spider 68 is provided with a central aperture 73 and shaft 72 is provided with a matching central aperture 74 for a purpose to be subsequently explained.

Control paddle shafting 72 also extends through the opposite sides of a hub member 76 in which shafting 72 is also journalled for rotation by means of bearings 77 in the hub member; the bearings 71 and 77 being retained in position by means including spacer rings 78 and retainer nuts 79. Hub member 76 provides a support for the diametrically opposite lift wings 2 which are journalled for collective pitch adjustment on the hub member. For this purpose, the hub member is formed with diametrically opposite trunnions 81 which extend along the cyclic pitch adjustment axis for the lift wings transversely at a right angle to the pitch adjustment axis for the control blades defined by shaft 72. The collective pitch journal mounting for each lift wing 2 includes a hollow sleeve portion 82 formed at the inner end of each lift wing mounting shaft 83. A bearing 84 is provided at the outer end of each trunnion 81, on which each sleeve 82 is piloted; and the inner end of each sleeve 82 is journalled on bearings 86 held in position by retainer nuts 87.

It is seen that lift wings 2 and control blades 3 are connected to the common hub member 76, and that cyclic pitch adjustment of the lift wings is effected about a first axis extending longitudinally of the lift wings. Such axis is defined by the axis of trunnion pins 67, inasmuch as hub member 76, through its mounting on shaft 72 in turn mounted in spider 68, can pivot about pins 67. Lift wings 2 can flap about a second axis transversely with respect to the first axis, defined by the axis of shafting 72. Control blades 3 are adjustable as to cyclic pitch about a third axis defined by shafting 72, which is coincident with said second or flapping axis for the lift wings. Also, control blades 3 can flap in unison about the axis of trunnions 67 which is also the cyclic pitch adjustment axis for the lift wings. Thus, as cyclic pitch is imparted to the control blades through the pilot controlled wobble mechanism connected to linkage to be described, they will ultimately effect cyclic pitch and resultant flapping of the lift wings, in the manner pointed out in the previously mentioned patents. In this connection, prongs 66 of work 64 extend with clearance into recesses 87' in diametrically opposite sides of hub 76 to provide safety limit stops for the flapping of the lift wings.

The independent journal mountings of lift wings 2 on trunnions 81 of hub member 76 provide for conventional collective pitch control of the lift wings, by means of axially shiftable shafting 88 extending through rotor shaft 4; such shafting including two sections having a universal connection 89 at the center of the universal mounting for the rotor head. The previously mentioned apertures 73 and 74 permit the passage of shafting 88 therethrough.

At its lower end, shafting 88 is piloted in a bearing 91, while the upper portion of such shafting is slidably mounted in a sleeve 92 formed on a bracket 93 fixedly secured to hub member 76. At its upper end, shafting 88 is pivotally connected to a pair of push rods 94; the lower end of each rod 94 being universally connected by a ball joint to a bracket plate 96 secured to each sleeve 82.

Such collective pitch control mechanism is usually provided but may be omitted. The connections of push rods 94 are at opposite sides of the sleeves 82 so that when shafting 88 is moved axially by any suitable pilot operable control actuating mechanism (not shown), the lift wings will be simultaneously adjusted equally in opposite directions, independently of any adjustments effected by the wobble mechanism, to effect equal pitch adjustment of the lift wings for the collective pitch control.

Means is provided, which is connected to the cyclic pitch control or wobble ring 58, to impart cyclic pitch control to the control blades 3, comprising diametrically opposite reversing linkages 97 of the type disclosed in the previously mentioned patents. Each linkage 97 comprises a pair of so-called scissors links; a lower link member 98 being pivotally connected to rotatable wobble ring 58 by means of a pivot pin 99 on upstanding lugs 101 fixedly secured to ring 58. At its outer end, each link 98 is pivotally connected by a pivot pin 102 to another link member 103.

Such link member 103 could be pivotally connected directly to the shafting 72 of the control blades, as disclosed in Patent 2,481,750, to impart cyclic pitch thereto as determined by the plane of inclination of the wobble mechanism. However, in the instant invention, link members 103 are indirectly connected to the control blades, by means of a feed back linkage which is movably connected between each control blade and a side of hub 76 of the universal mount, to produce the effects mentioned previously, and in detail in Patent 2,534,353. For this purpose, the upper end of each link 103 is anchored by means of a universal connection at 104, to a feed-back lever 106 extending below and substantially parallel to shafting 72.

The inner end of each lever 106 is universally connected to a side of hub member 76 by universal connection 107; such universal connection 107 being on a bracket plate 108 secured to the hub by screws 109. At its outer end, each lever 106 has a universal connection 111 with an upstanding arm 112 which is forked at its upper end and is pivotally connected to shafting 72 by a pivot pin 113 extending transversely with respect to the axis of such shafting. Universal connections 107 and 111 are preferably the same distance from the axis of shafting 72.

*Operation.*—Schematic Fig. 6 may be best referred to for an explanation of the operation which will be described by assuming certain conditions typical of the operation. For example, should the pilot tilt the wobble mechanism to control the pitch of the control blades, so as to cause the lift wings to flap ultimately in the direction indicated by arrow A in Fig. 6, the universal connection 107 between feed-back lever 106 and hub 76 will be moved forwardly as indicated by the direction arrow B. Since lever 106 is universally anchored on the upper end of link member 103, the opposite end of lever 106 will be moved rearwardly in an opposite direction, as indicated by direction arrow C, thus causing pitch adjustment of the shafting 72 as indicated by the direction arrow C', to cancel out some of the cyclic pitch which was initially imparted to the control blades by the pilot operable wobble mechanism.

In this connection, the length of distance D between the center of universal connection 107 and the center of universal connection 104, relative to the distance L between the center of universal connection 104 and the center of universal connection 111, is the feed-back ratio referred to in the previously mentioned Patent 2,534,353. It is preferred that this ratio be 1. In other words, the distance D is equal to the distance L, but such ratio may be any predetermined ratio as it may vary as is pointed out in the aforementioned Patent 2,534,353.

As in that patent, the input ratio which is the ratio of the distance X to the distance Y indicated in Fig. 6, which is determined by the leverage and lengths of link members 98 and 103 in the neutral position of the wobble mechanism, with respect to the length of arm 112 is preferably greater than 1, and is preferably about 2½ to 1 so that a mechanical advantage obtains whereby for any given angle of tilt to which the wobble mechanism may be adjusted from a given position by control stick 54, the angle of pitch adjustment of the control blades will be multiplied according to such ratio. As previously explained, when the control blades are adjusted by the control stick, some of this adjustment will be cancelled out by the described feed-back leverage effect.

We claim:

1. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; a linkage connection between said control blade and said universal mount structure to effect pitch change of said control blade upon flapping of said lift wing and pilot operable control means including a link member movably connected to said linkage connection at a location intermediate the points of connection of said linkage connection with said control blade and said universal mount structure.

2. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; a linkage connection between said control blade and said universal mount structure to effect pitch change of said control blade upon flapping of said lift wing; and pilot operable means for effecting pitch adjustment of said control blade including wobble mechanism, a pilot operable control member connected to said wobble mechanism, and a linkage connection between said wobble mechanism and said first mentioned linkage connection including a link member movably connected to said first mentioned linkage connection at a location intermediate the points of connection of said first mentioned linkage connection with said control blade and said universal mount structure.

3. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member to which the lift wing and the control blade are connected; a linkage including a lever member movably connected between said control blade and said hub member to effect pitch change of said control blade upon flapping of said lift wing and pilot operable control means including a link member movably connected to said lever member at a location intermediate the points of connection of said lever member with said control blade and said hub member.

4. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member to which the lift wing and the control blade are connected; a linkage including a lever member movably connected between said control blade and said hub member to effect pitch change of said control blade upon flapping of said lift wing; and pilot operable means for effecting pitch adjustment of said control blade including wobble mechanism, a pilot operable control member connected to said wobble mechanism, and a linkage connection between said wobble mechanism and said lever member including a link member movably connected to said lever member at a location intermediate the points of connection of said lever member with said control blade and said hub member.

5. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member to which the lift wing and a support shaft for the control blade are connected; a linkage to effect pitch change of said control blade upon flapping of said lift wing including a lever member movably connected to said hub member, and an arm movably connected to said lever member and to said control blade support shaft and pilot operable control means including a link member movably connected to said lever member at a location intermediate the points of connection of said lever member with said arm and said hub member.

6. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member to which the lift wing and a support shaft for the control blade are connected; a linkage to effect pitch change of said control blade upon flapping of said lift wing including a lever member movably connected to said hub member, and an arm movably connected to said lever member and to said control blade support shaft; and pilot operable means for effecting pitch adjustment of said control blade including wobble mechanism, a pilot operable control member connected to said wobble mechanism, and a linkage connection between said wobble mechanism and said lever member including a link member movably connected to said lever member at a location intermediate the points of connection of said lever member with said arm and said hub member.

7. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member on which the lift wing is mounted, shafting journalled in said hub member and on which the control blade is mounted, a forked member rotatable about the axis of said column, and a spider member pivoted on said forked member and in which said shafting is journalled; a linkage including a lever member movably connected between said shafting and said hub member to effect pitch change of said control blade upon flapping of said lift wing and pilot operable control means including a link member movably connected to said lever member intermediate the points of connection of said lever member with said shafting and said hub member.

8. In a rotary wing aircraft; a lift wing supporting column; a lift wing; a control blade therefor; a universal mount structure supported by said column and supporting said lift wing and said control blade for rotation about the axis of said column, pitch adjustment of the lift wing about a first axis extending longitudinally of the lift wing, flapping of the lift wing about a second axis extending transversely with respect to the first axis, and pitch adjustment of the control blade about a third axis also extending transversely with respect to said first axis whereby pitch adjustment of the control blade results through aerodynamic forces in ultimate flapping of the lift wing about said second axis; said universal mount structure including a hub member on which the lift wing is mounted, shafting journalled in and extending through said hub member upon which the control blade is mounted, a forked member rotatable about the axis of said column, and a spider member pivoted on said forked member and in which said shafting is journalled; a linkage including a lever member movably connected between said shafting and said hub member to effect pitch change of said control blade upon flapping of said lift wing; pilot operable means for effecting pitch adjustment of said control blade including wobble mechanism, a pilot operable control member connected to said wobble mechanism, and a linkage connection between said wobble mechanism and said lever member including a link member movably connected to said lever member at a location intermediate the points of connection of said lever member with said shafting and said hub member.

9. In a rotary wing aircraft, a pair of opposite lift wings, a pair of opposite control blades therefor positioned transversely with respect to the lift wings, a hub member upon which the lift wings are mounted, shafting upon which the control blades are mounted extending through and journalled in said hub member, a rotatable forked member, and a spider member pivotally mounted on said forked member on an axis extending transversely with respect to said shafting and in which the shafting is journalled.

10. In a rotary wing aircraft, a pair of opposite lift wings, a pair of opposite control blades therefor positioned transversely with respect to the lift wings, a hub member upon which the lift wings are mounted, shafting upon which the control blades are mounted extending through and journalled in said hub member, a rotatable forked member, and a spider member pivotally mounted on said forked member on an axis extending transversely with respect to said shafting and in which the shafting is journalled, said shafting and said spider member being apertured to allow passage of a control member therethrough.

11. In a rotary wing aircraft, a pair of opposite lift wings, a pair of opposite control blades therefor positioned transversely with respect to the lift wings, a hub member upon which the lift wings are mounted, shafting upon which the control blades are mounted extending through and journalled in said hub member, a rotatable forked member, a spider member pivotally mounted on said forked member on an axis extending transversely with respect to said shafting and in which the shafting is journalled, a feed back leverage for changing the pitch of said control blades upon flapping of the lift wings comprising a lever member movably connected to each of opposite sides of said hub member and to the shafting, and pilot operable control means including a link member movably connected to each of said lever members at a location intermediate the points of connection of each of said lever members with said hub member and said shafting.

12. In a rotary wing aircraft, a pair of opposite lift wings, a pair of opposite control blades therefor positioned transversely with respect to the lift wings, a hub member upon which the lift wings are mounted, shafting upon which the control blades are mounted extending through and journalled in said hub member, a rotatable forked member, a spider member pivotally mounted on said forked member on an axis extending transversely with respect to said shafting and in which the shafting is journalled; a feed back leverage for changing the pitch of said control blades upon flapping of the lift wings comprising an arm movably connected to the shafting between each of opposite sides of the hub member and a control blade, and a lever member movably connected to each of such opposite sides and to an arm; and pilot operable control means including a link member movably connected to each of said lever members at a location intermediate the points of connection of each of said lever members with said hub member and an arm.

13. In a rotary wing aircraft, a pair of opposite lift wings, a pair of opposite control blades therefor positioned transversely with respect to the lift wings, a hub member upon which the lift wings are mounted, shafting upon which the control blades are mounted extending through and journalled in said hub member, a rotatable forked member, a spider member pivotally mounted on said forked member on an axis extending transversely with respect to said shafting and in which the shafting is journalled; a feed back leverage for changing the pitch of said control blades upon flapping of the lift wings comprising an arm movably connected to the shafting between each of opposite sides of the hub member and a control blade, and a lever member movably connected to each of such opposite sides and to an arm; and pilot operable means connected to said control blades including wobble mechanism, a pilot operable control member connected to said wobble mechanism, and a linkage connection between said wobble mechanism and each of said lever members including a link member movably connected to each of said lever members at a location intermediate the points of connection of each of said lever members with said hub member and an arm.

14. In a rotary wing aircraft wherein a lift wing and a control blade positioned transversely with respect to the lift wing are mounted by means including a common hub member for rotation about the axis of a supporting column and for universal movement to enable flapping and pitch adjustment of both the lift wing and the control blade, a feed back leverage for changing the pitch of the control blade upon flapping of the lift wing comprising a lever member movably connected to said hub member and to the control blade, and pilot operable control means for changing the pitch of the control blade including wobble mechanism and a linkage connection between said wobble mechanism and said lever member including a link member movably connected to said lever member at a location intermediate the points of connection of said lever member with said control blade and said hub member.

STANLEY HILLER, Jr.
HAROLD H. SIGLER.

REFERENCES CITED

The following references are of record in the file of this patent:

UNITED STATES PATENTS

| Number | Name | Date |
|---|---|---|
| 1,800,470 | Oehmichen | Apr. 14, 1931 |
| 1,828,783 | Oehmichen | Oct. 27, 1931 |
| 2,481,750 | Hiller, Jr. et al. | Sept. 13, 1949 |
| 2,534,353 | Hiller, Jr. et al. | Dec. 19, 1950 |